Figure 1:
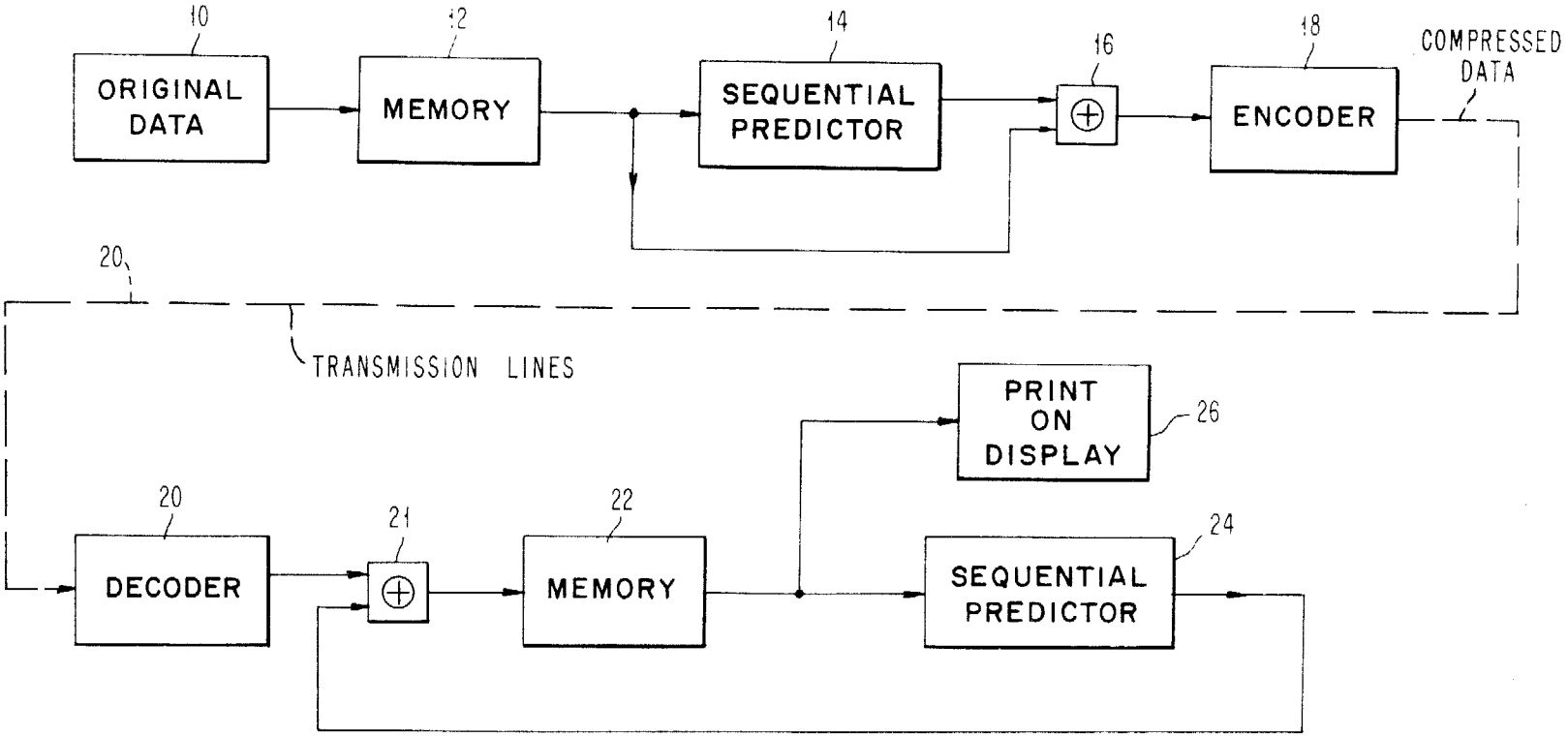
Figure 2:
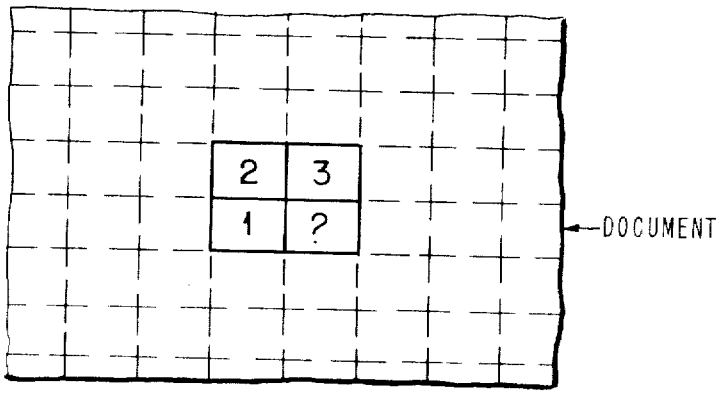
Figure 3:
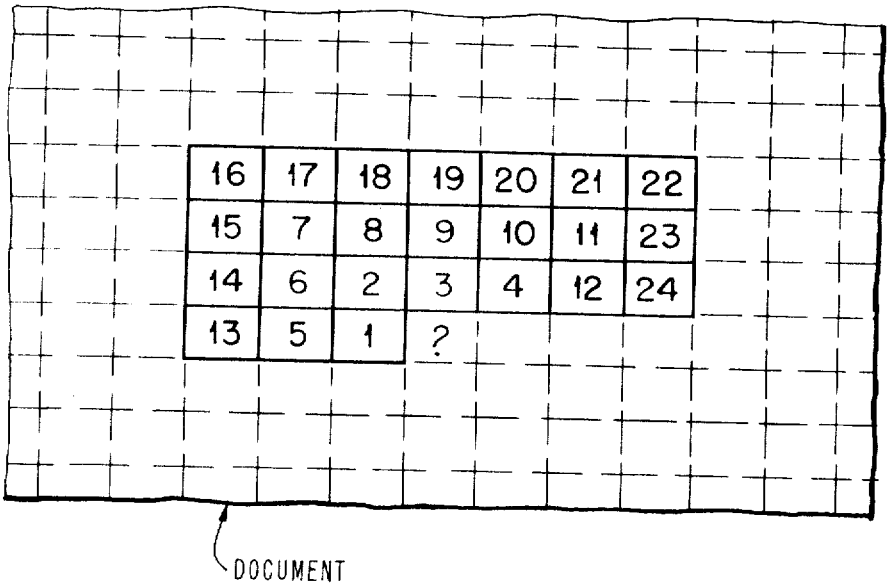
Figure 4:
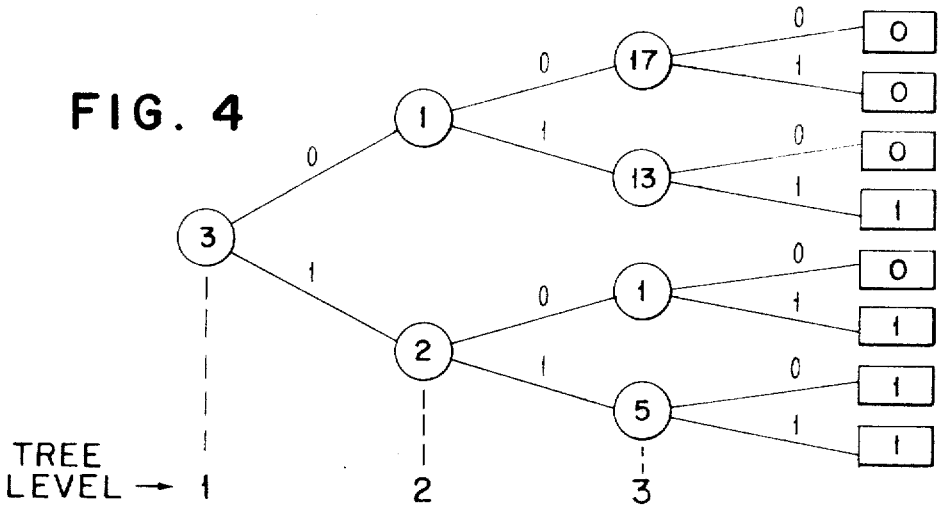
Figure 5:
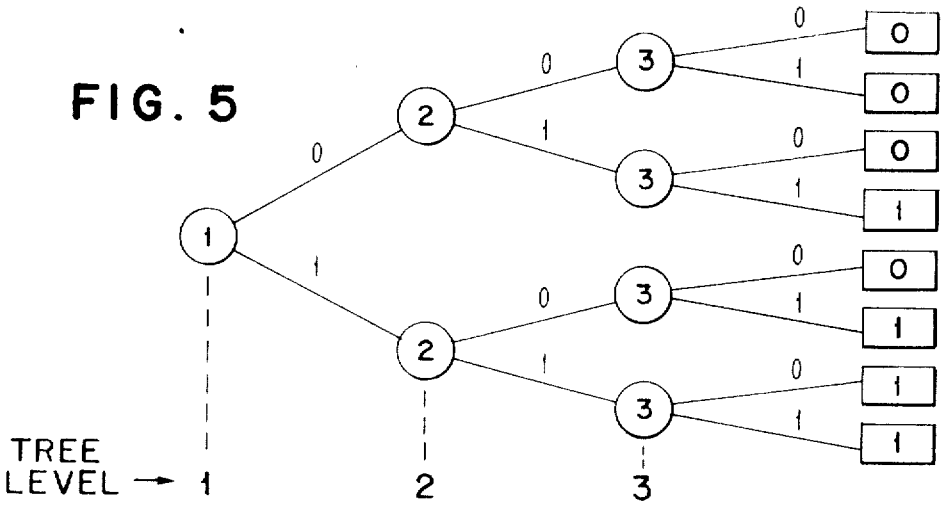
Figure 6:
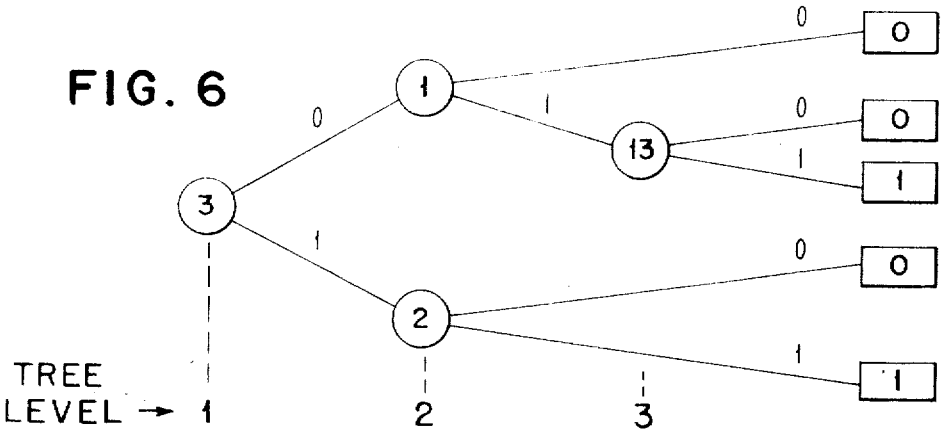
Figures 7, 7A:
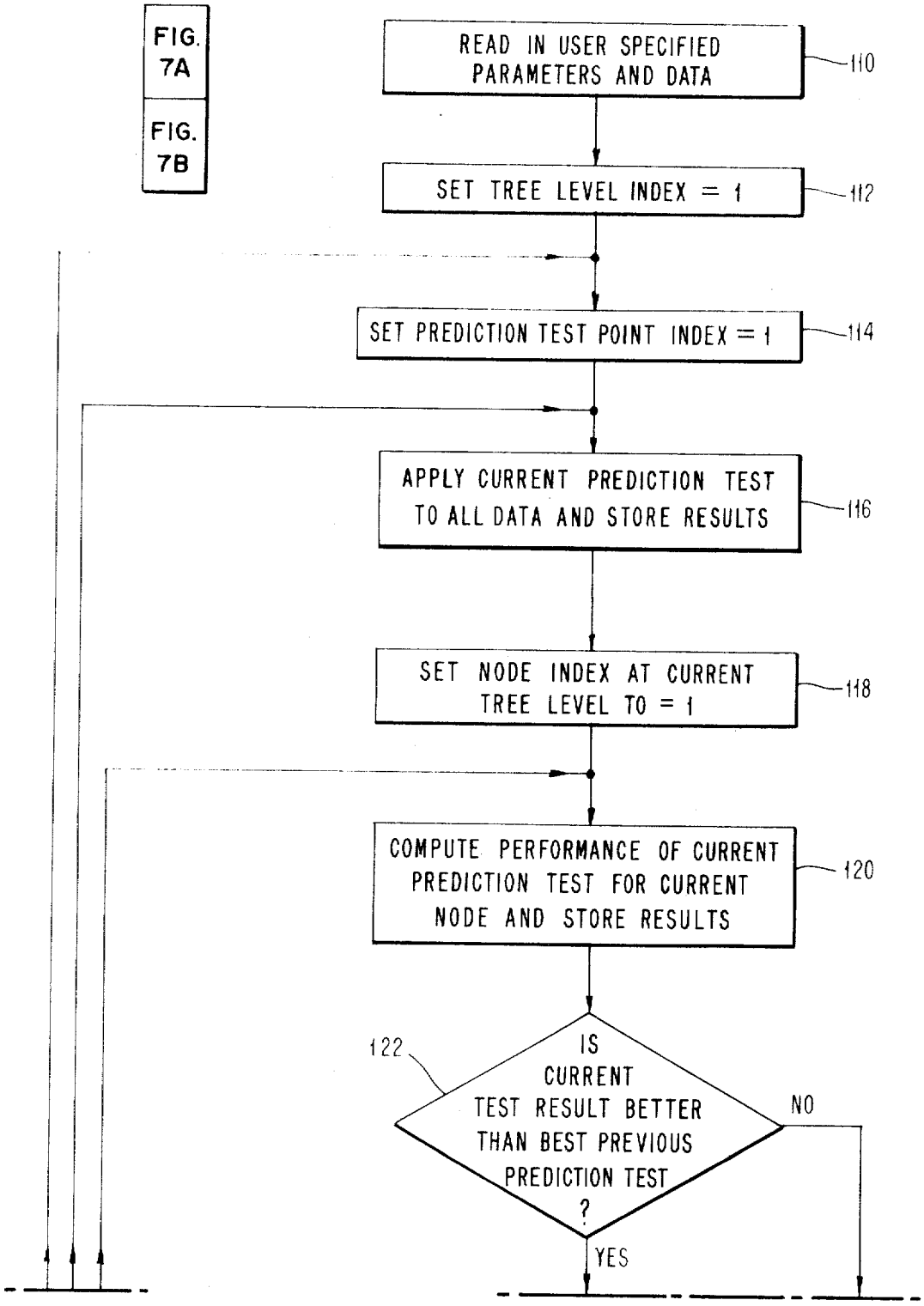
Figure 7B:
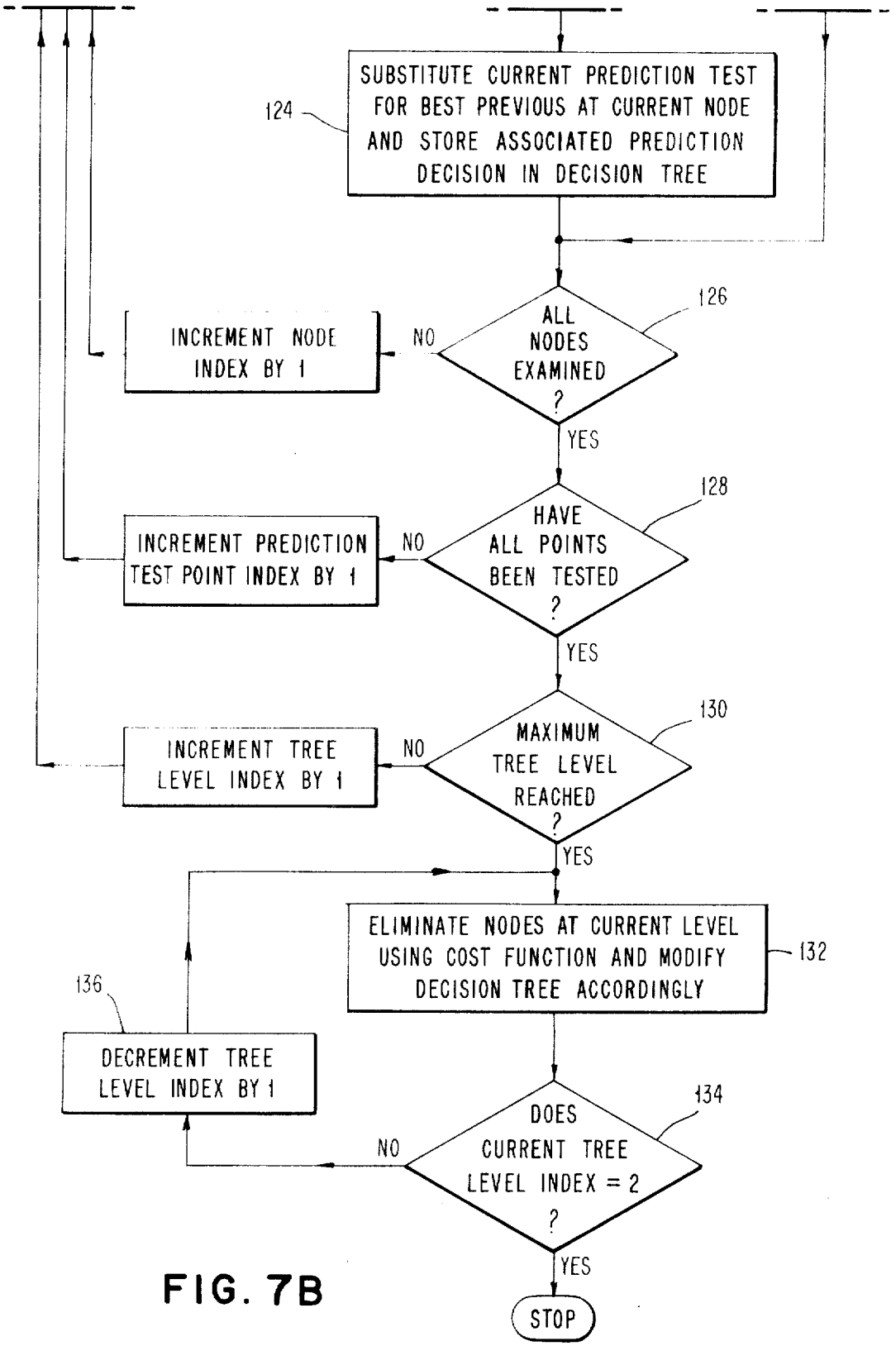
Figures 8, 8A, 8B, 8C, 8D:
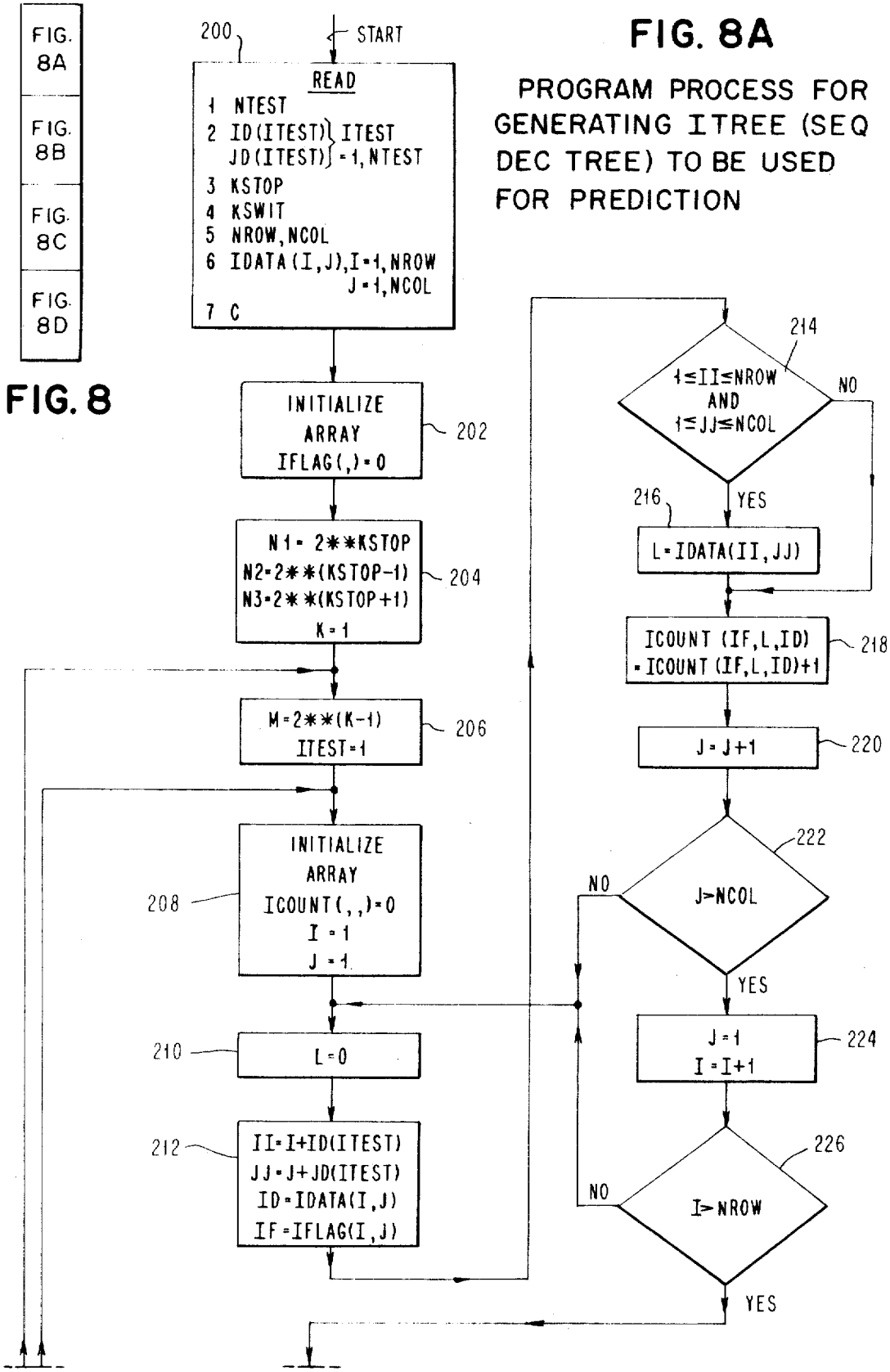
Figure 8B:
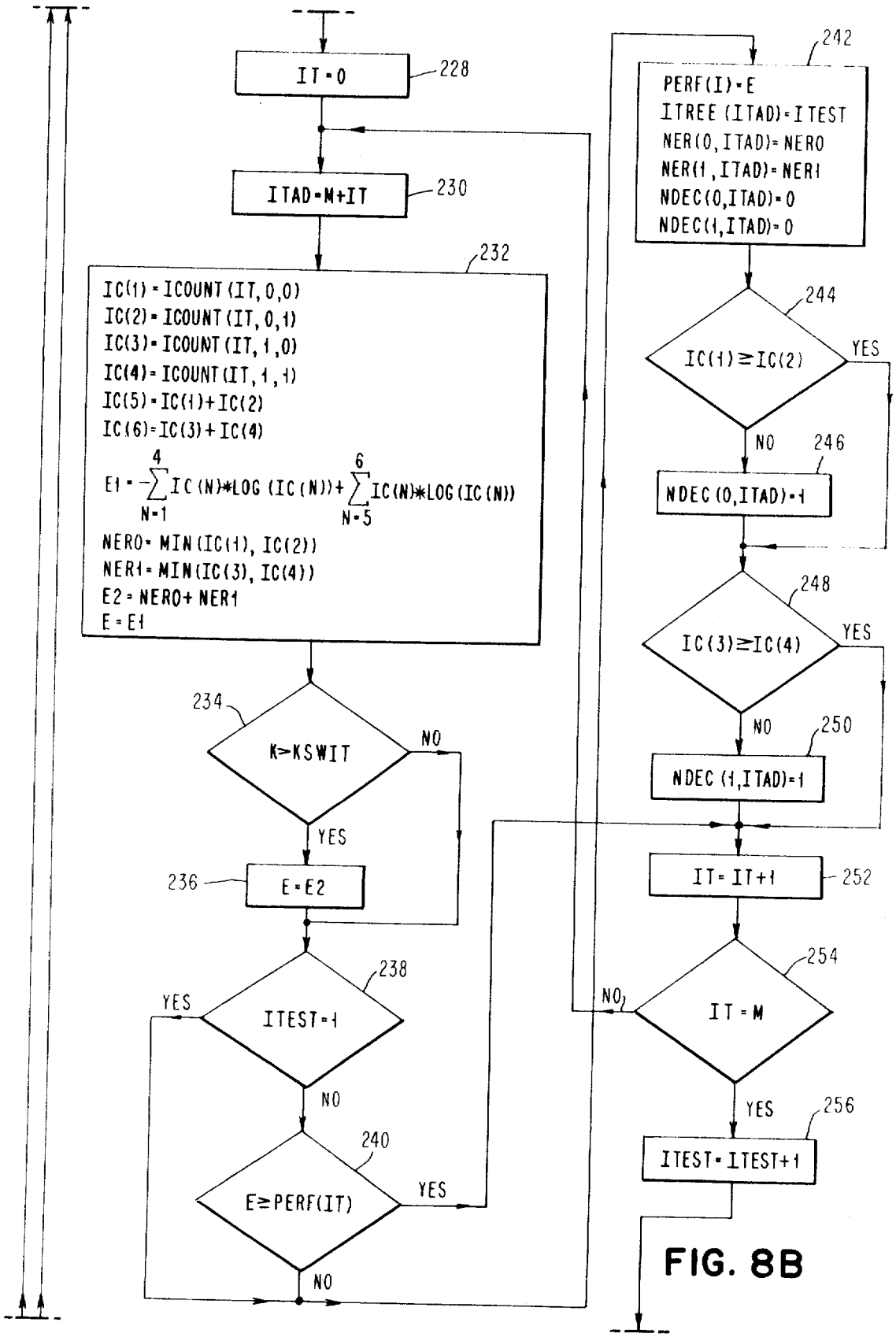
Figure 8C:
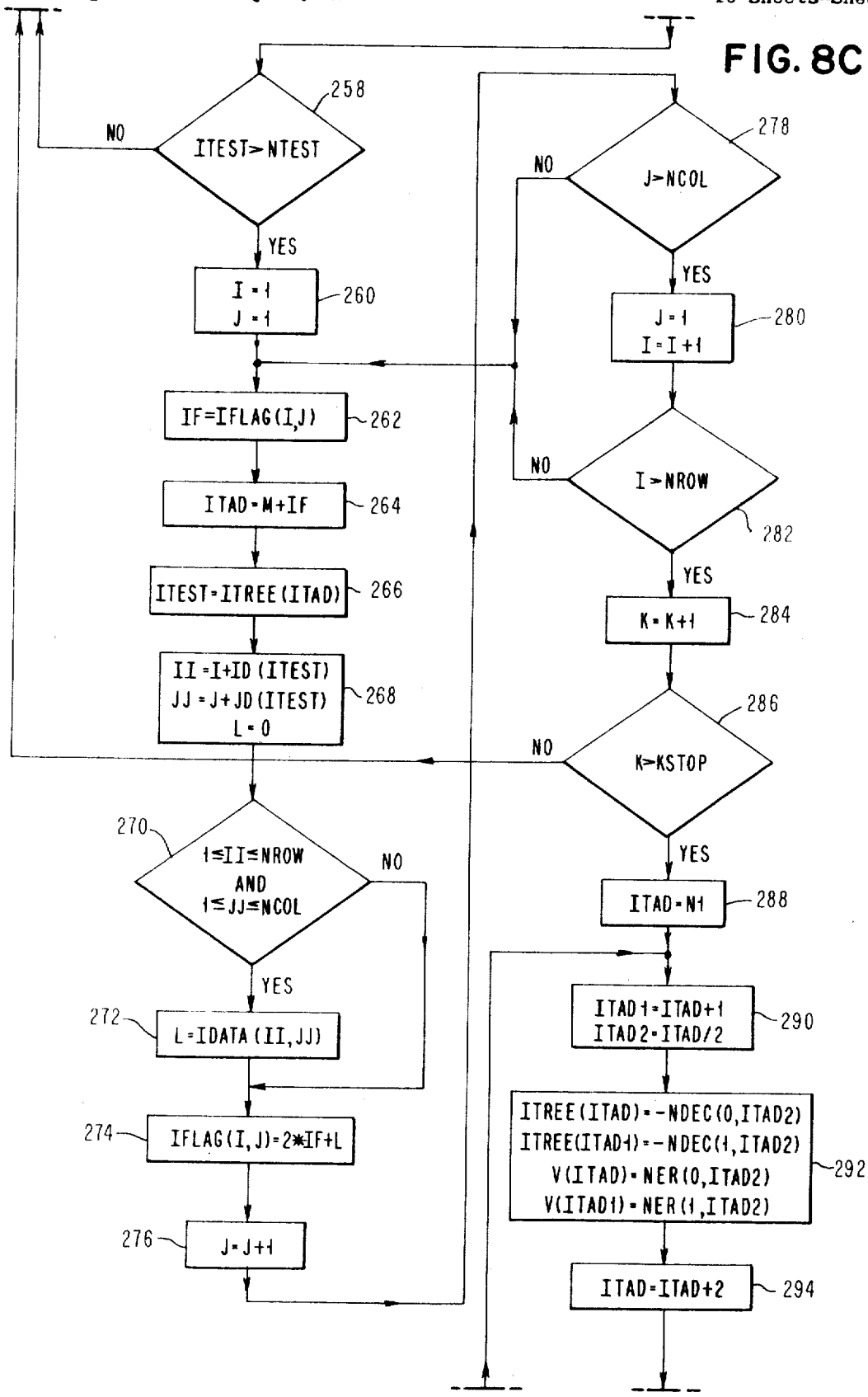
Figure 8D:
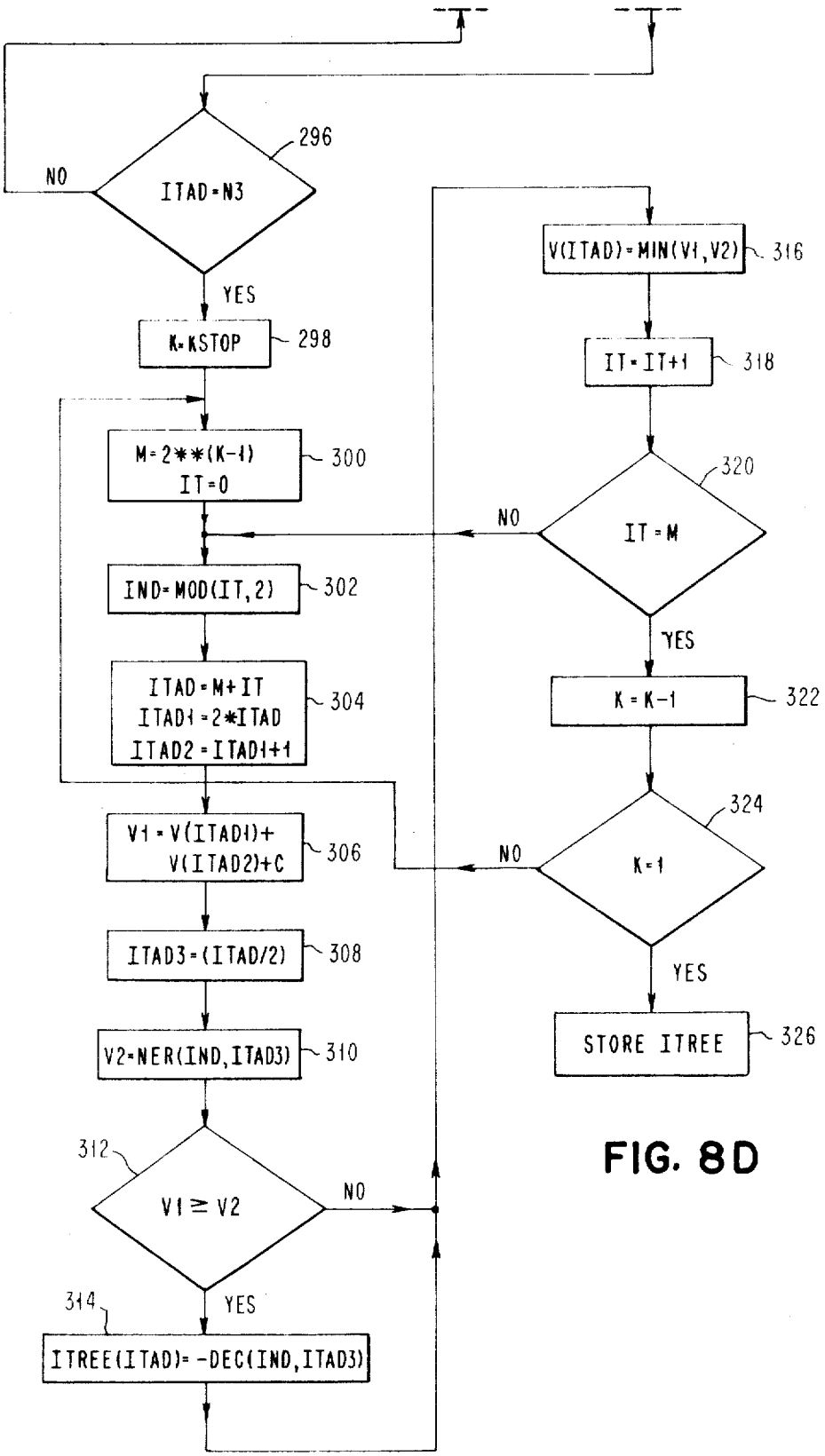
Figure 9:
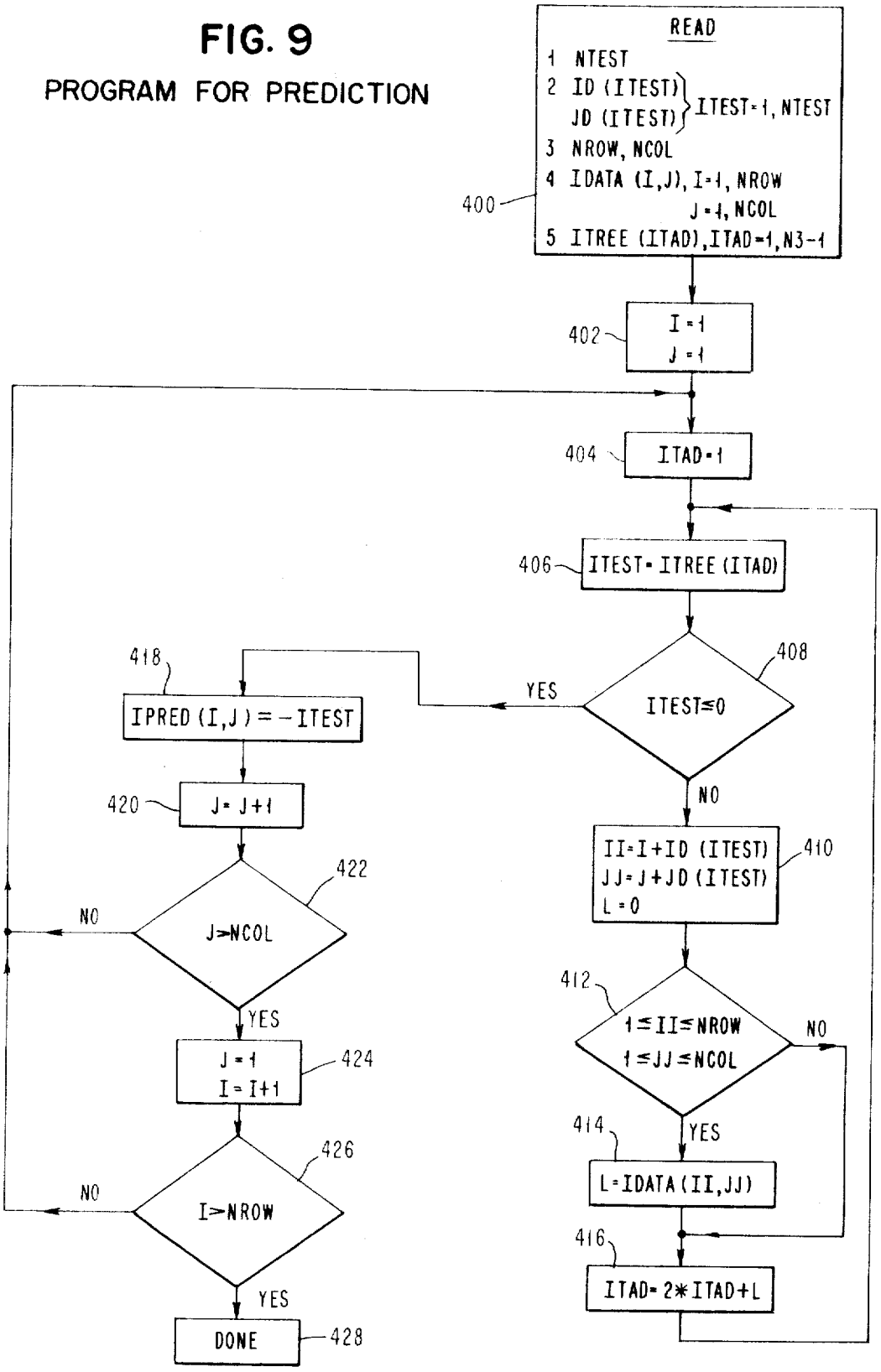

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 5, 1974

928 O.G. 6

T928,003

SEQUENTIAL LEARNING PREDICTOR FOR AN IMAGE COMPRESSION SYSTEM

Lalit R. Bahl, Yorktown Heights, N.Y., Daniel I. Barnea, Tel Aviv, Israel, and Hisashi Kobayashi, Mohegan Lake, N.Y., assignors to International Business Machines Corporation, Armonk, N.Y.

Continuation of abandoned application Ser. No. 365,335, May 30, 1973. This application July 23, 1973, Ser. No. 381,950

Int. Cl. H04n *7/12*

U.S. Cl. 235—154

10 Sheets Drawing. 26 Pages Specification

A system is disclosed for compacting digital image data by means of predictive coding. The prediction decision rule is developed by a heuristic sequential learning process from a sample image data set.

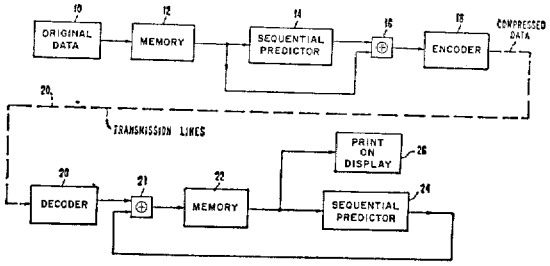

A large set of two dimensional image points represented in binary form is processed in order to generate a prediction decision tree structure. The decision tree is stored within the predictor memory, then, each image point taken from a set of data that is to be compressed, is predicted in accordance with the stored prediction tree structure. The predicted value is then added, modulo-two, to the actual binary value of the image point. The resulting output of the modulo-two addition is then compressed by conventional means into data that is transmitted to a receiving unit. The receiving unit contains both a decoder for expanding the data, and an inverse predictor for creating a data pattern representative of the image that was transmitted.

SEQUENTIAL LEARNING PREDICTOR FOR AN IMAGE COMPRESSION SYSTEM

Original Filed May 30, 1973 10 Sheets-Sheet 1

3 POINT PREDICTOR (PRIOR ART)

SEQUENTIAL LEARNING PREDICTOR FOR AN IMAGE COMPRESSION SYSTEM

Original Filed May 30, 1973 10 Sheets-Sheet

SEQUENTIAL LEARNING PREDICTOR FOR AN IMAGE COMPRESSION SYSTEM

Original Filed May 30, 1973 10 Sheets-Sheet 6

PROGRAM PROCESS FOR GENERATING ITREE (SEQ DEC TREE) TO BE USED FOR PREDICTION

SEQUENTIAL LEARNING PREDICTOR FOR AN IMAGE COMPRESSION SYSTEM

Original Filed May 30, 1973 10 Sheets-Sheet 7

SEQUENTIAL LEARNING PREDICTOR FOR AN IMAGE COMPRESSION SYSTEM

Original Filed May 30, 1973 10 Sheets-Sheet 8

SEQUENTIAL LEARNING PREDICTOR FOR AN IMAGE COMPRESSION SYSTEM

Original Filed May 30, 1973 10 Sheets-Sheet

PROGRAM FOR PREDICTION